United States Patent
Abe

(10) Patent No.: US 7,226,077 B2
(45) Date of Patent: Jun. 5, 2007

(54) AIRBAG, AIRBAG ASSEMBLY AND AIRBAG DEVICE

(75) Inventor: Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 384 days.

(21) Appl. No.: 10/873,213

(22) Filed: Jun. 23, 2004

(65) Prior Publication Data

US 2005/0052009 A1    Mar. 10, 2005

(30) Foreign Application Priority Data

Sep. 9, 2003    (JP) .............................. 2003-317004

(51) Int. Cl.
*B60R 21/26* (2006.01)
(52) U.S. Cl. ................ 280/736; 280/730.1; 280/743.1; 280/728.1
(58) Field of Classification Search ............ 280/730.1, 280/743.1, 736, 742, 728.1
See application file for complete search history.

(56) References Cited

U.S. PATENT DOCUMENTS

| 6,203,057 B1 * | 3/2001 | Spencer et al. .......... 280/730.1 |
| 6,715,789 B2 | 4/2004 | Takimoto et al. |
| 6,942,245 B2 * | 9/2005 | Takimoto et al. ........ 280/730.1 |
| 2003/0184069 A1 * | 10/2003 | Takimoto et al. ........ 280/743.1 |
| 2005/0023802 A1 * | 2/2005 | Enders et al. ............ 280/728.2 |

FOREIGN PATENT DOCUMENTS

| JP | 09175302 | 7/1997 |
| JP | 2002-337651 | 11/2002 |
| JP | 2002-337652 | 11/2002 |
| JP | 2003-40069 | 2/2003 |
| JP | 2003-40071 | 2/2003 |
| JP | 2003-40072 | 2/2003 |
| JP | 2003040071 | 2/2003 |
| JP | 2003-112596 | 4/2003 |

* cited by examiner

*Primary Examiner*—Paul N. Dickson
*Assistant Examiner*—Timothy D. Wilhelm
(74) *Attorney, Agent, or Firm*—Manabu Kanesaka

(57) ABSTRACT

An airbag includes an airbag body, and a support sheet attached to the airbag body. Each of the airbag body and the support sheet has a gas-generator insertion hole. The insertion holes are disposed separately, wherein the support sheet faces the insertion hole of the airbag body and the airbag body faces the insertion hole of the support sheet. A space between the insertion holes of the airbag body and the support sheet serves as a gas-generator insertion space.

11 Claims, 5 Drawing Sheets

AIRBAG, AIRBAG ASSEMBLY AND AIRBAG DEVICE

BACKGROUND OF THE INVENTION AND RELATED ART STATEMENT

The present invention relates to an airbag installed in a vehicle to be inflated in case of emergency such as a crash, an airbag assembly in which a gas generator is attached to the airbag, and an airbag device equipped with a retainer and the airbag assembly. More specifically, the invention relates to an airbag particularly suitable for a knee airbag, an airbag assembly in which a rod-shaped gas generator passes through an insertion hole, and an airbag device thereof.

Japanese Patent Publication (Kokai) No. 2003-40071 has disclosed a knee airbag system including an airbag and a rod-shaped cylindrical gas generator inserted in an insertion hole of the airbag for inflating the airbag in front of knees of an occupant in a front-seat in case of a car crash. In the airbag system, most of the gas generator is housed in the airbag, and a rear end of the gas generator projects outwardly from the insertion hole of the airbag. A lead wire for feeding an ignition current is connected to the rear and of the gas generator.

In the airbag system disclosed in Japanese Patent Publication (Kokai) No. 2003-40071, when the gas generator is operated, gas is easy to leak between an inner periphery of the insertion hole of the airbag and an outer periphery of the gas generator. Accordingly, it is necessary to use a high-output gas generator.

In view of the problem described above, an object of the present invention is to provide an airbag, an airbag assembly and an airbag device in which it is possible to prevent gas from leaking from an insertion hole.

Further objects and advantages of the invention will be apparent from the following description of the invention.

SUMMARY OF THE INVENTION

According to the present invention, an airbag includes an airbag body and a support sheet attached to the airbag body. Each of the airbag body and the support sheet has a gas-generator insertion hole. The insertion holes are disposed separately, wherein the support sheet faces the insertion hole of the airbag body and the airbag body faces the insertion hole of the support sheet. A space between the insertion holes of the airbag body and the support sheet serves as a gas-generator insertion space.

In an airbag assembly according to the invention, a gas generator passes through the insertion holes of the airbag, wherein a distal end of the gas generator is disposed in the airbag, and a rear end of the gas generator is disposed outside the airbag.

According to the invention, a connecting portion between the airbag body and the support sheet is disposed in the vicinity of the insertion space, and the connecting portion extends in a direction to connect the insertion holes together.

In the airbag and the airbag assembly according to the present invention, the gas generator passes through the insertion holes of the support sheet and the airbag body. Accordingly, it is possible to eliminate gas leakage from the insertion hole as opposed to a conventional device in which a gas generator passes though only one insertion hole. Accordingly, the airbag can be inflated sufficiently early even with a low-output gas generator.

In the present invention, the connecting portion connecting the airbag body and the support sheet is disposed in the vicinity of the insertion space. When the connecting portion extends in the direction to connect the insertion holes with each other, at least a part of the gas-generator insertion space between the insertion holes is shaped like a tunnel. Since the gas generator passes through the tunnel-like space, the gas leakage from the insertion hole becomes extremely low.

DETAILED DESCRIPTION OF PREFERRED EMBODIMENTS

Figure 1:
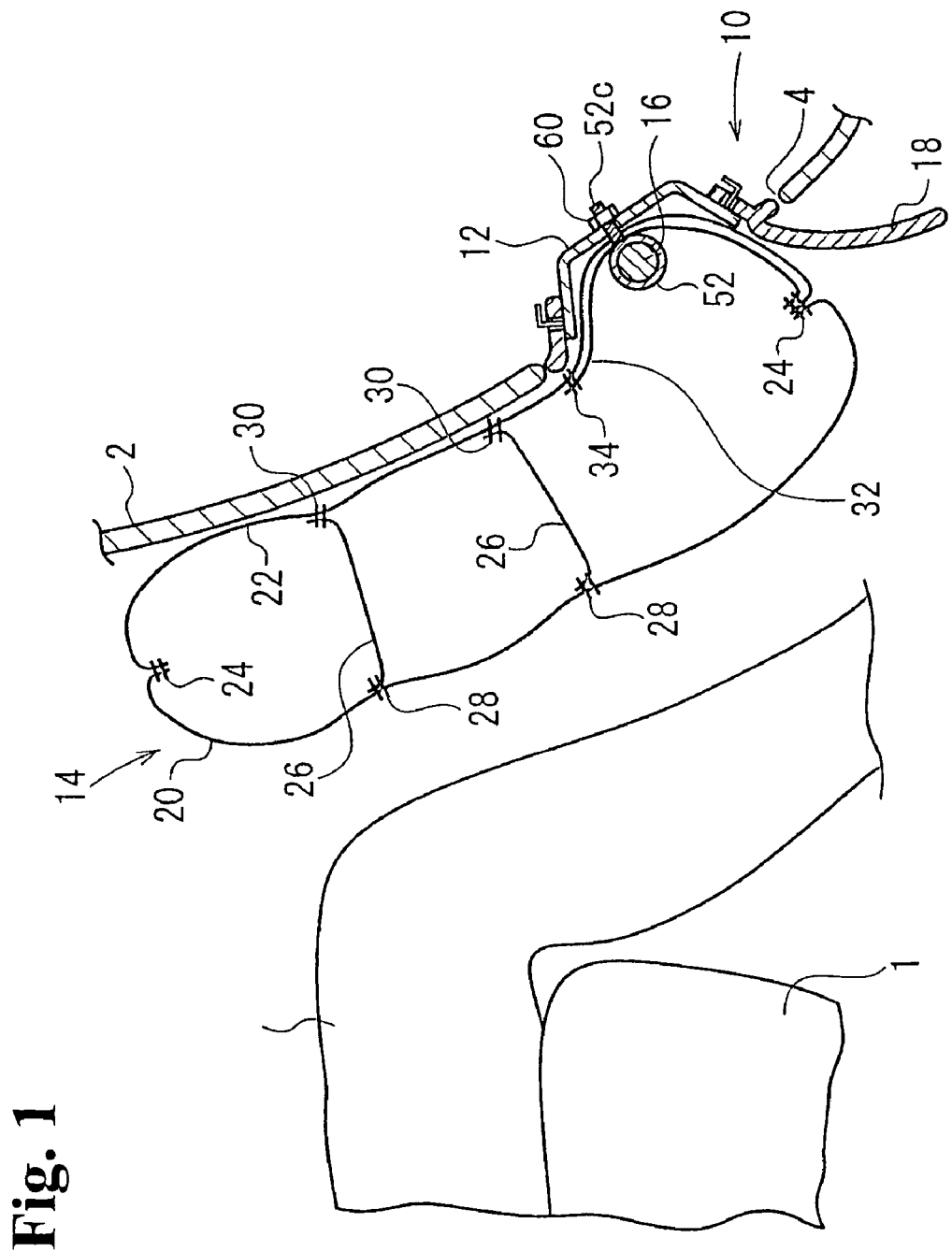
FIG. 1 is a cross sectional view of a knee airbag system as an airbag assembly including an airbag according to an embodiment of the present invention.
Figure 2:
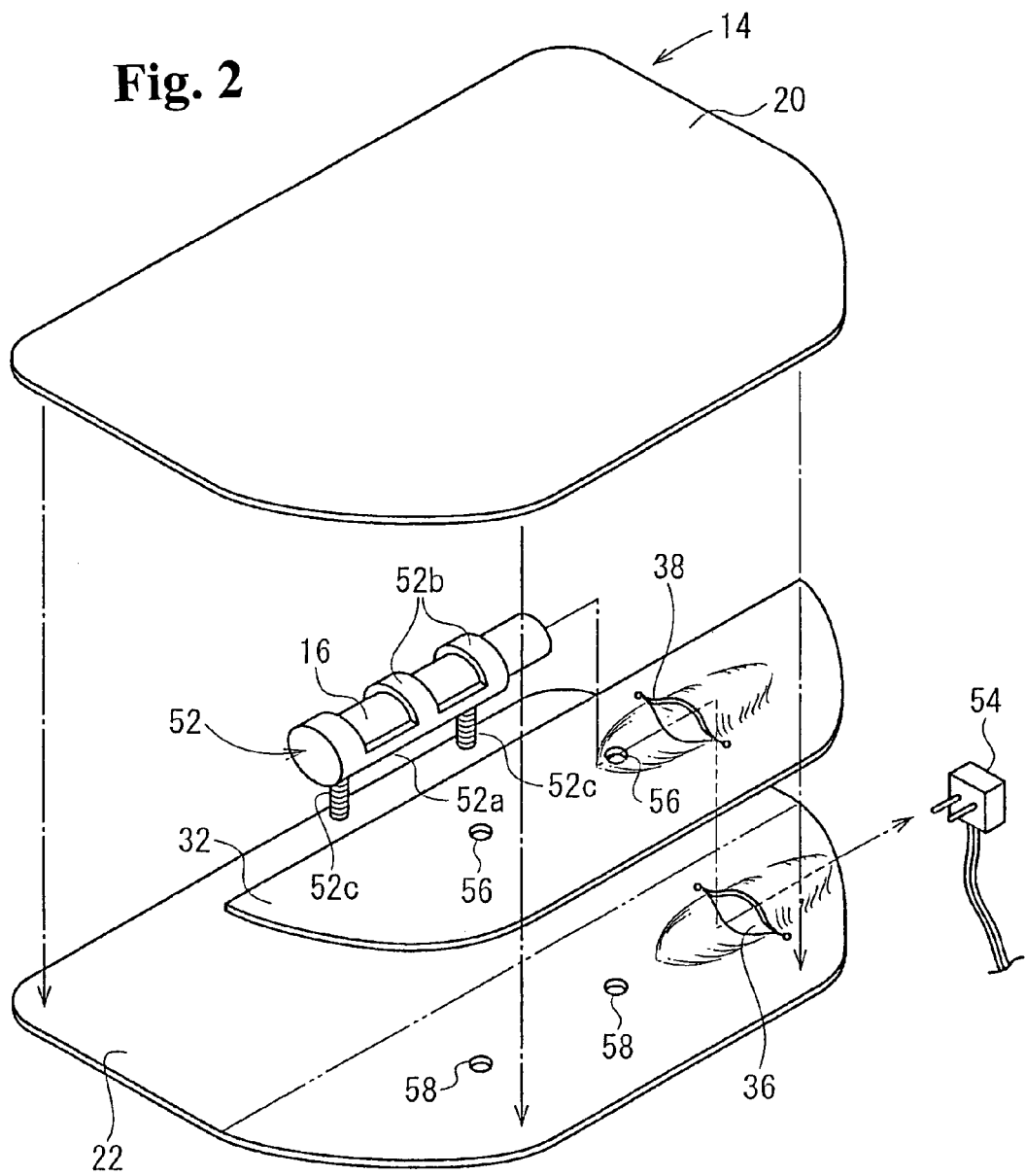
FIG. 2 is an exploded perspective view of the knee airbag shown in FIG. 1.
Figure 3:
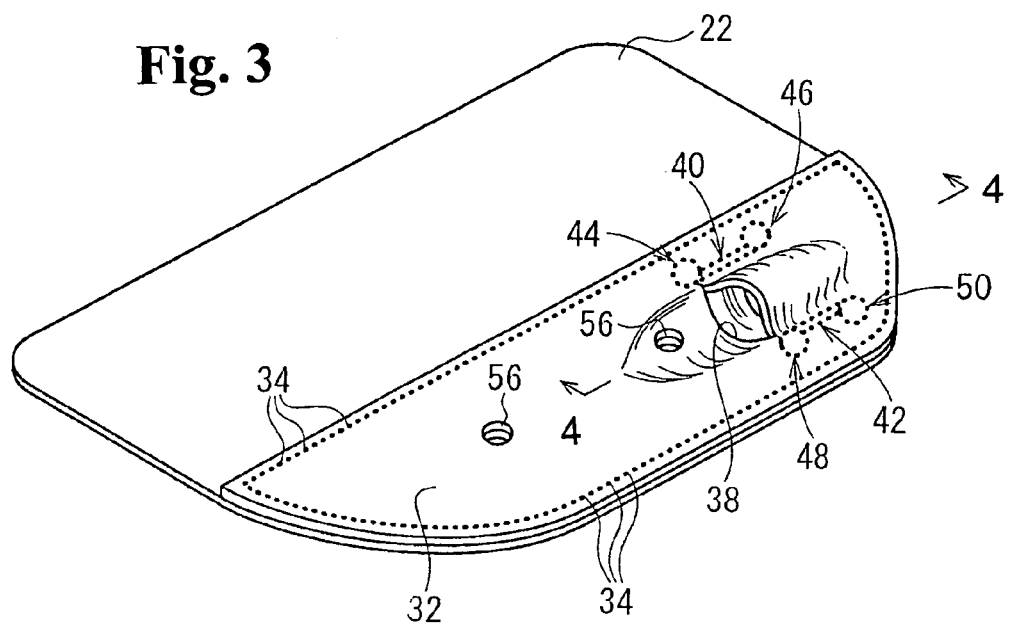
FIG. 3 is a perspective view of a rear panel having a support sheet.
Figure 4:
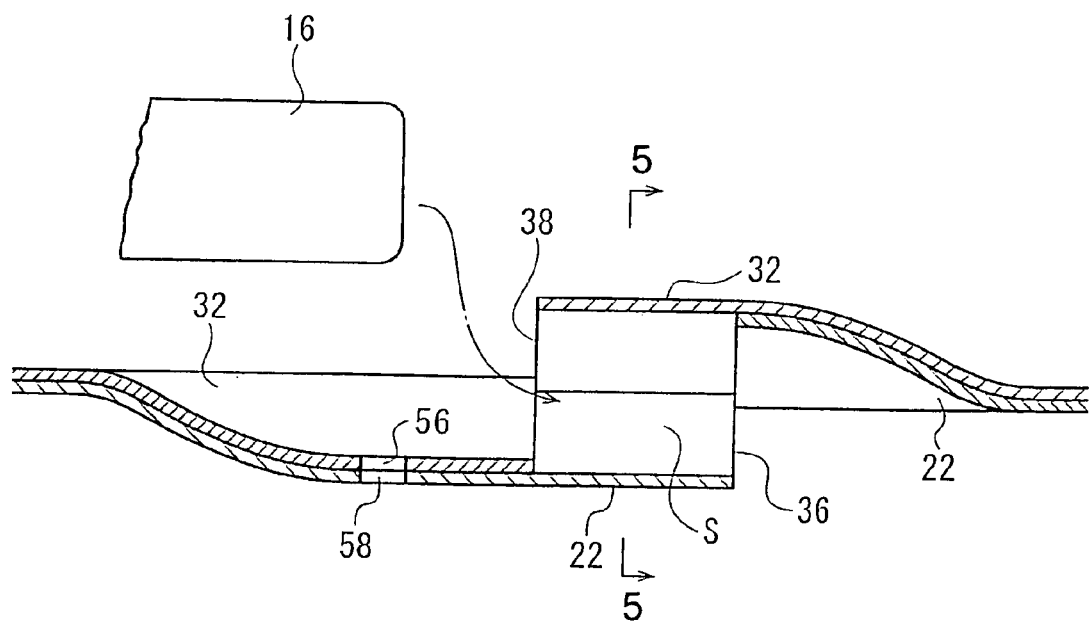
FIG. 4 is a cross sectional view taken along line 4—4 in FIG. 3.
Figure 5:
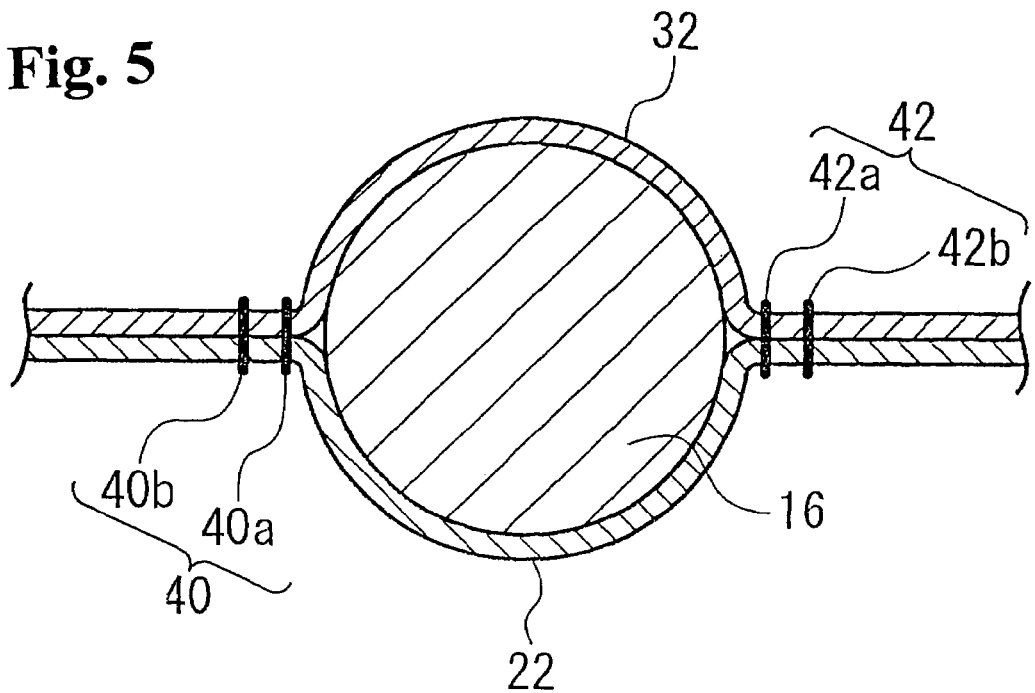
FIG. 5 is an enlarged cross sectional view taken along line 5—5 in FIG. 4.
Figure 6:
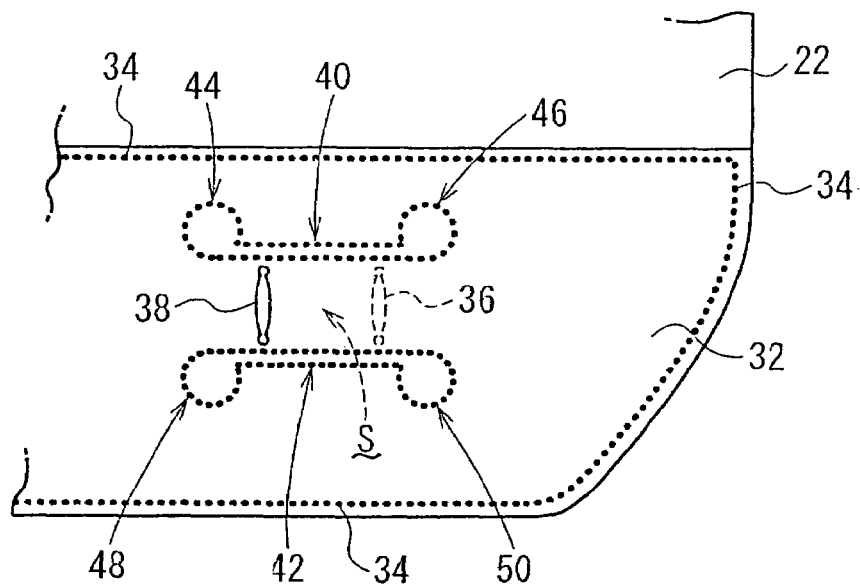
FIG. 6 is a plan view of a vicinity of a gas-generator insertion hole of the rear panel with a support sheet.
Figure 7:
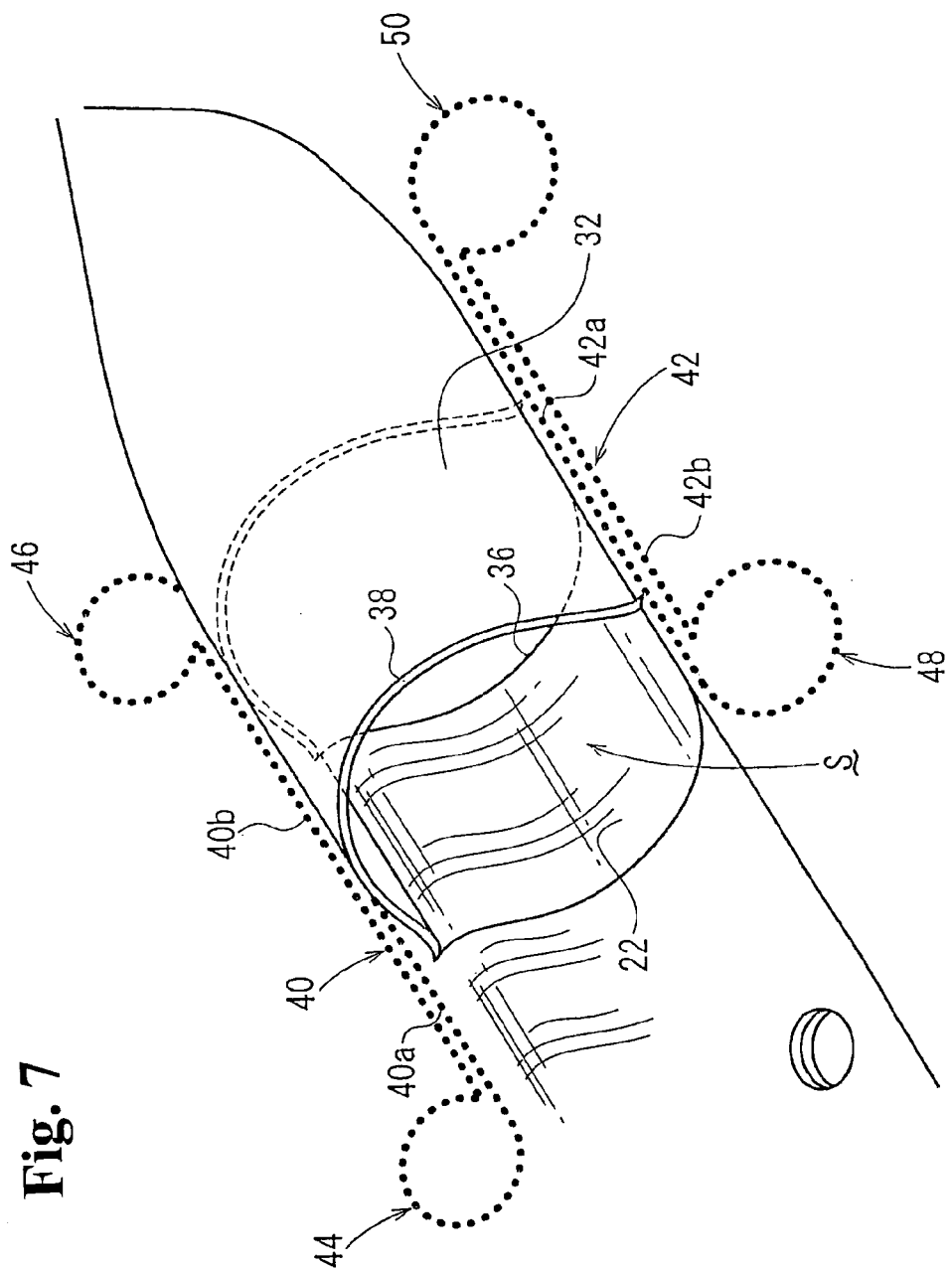
FIG. 7 is an enlarged perspective view of the gas-generator insertion hole.

Hereunder, embodiments of the present invention will be described with reference to the accompanying drawings. FIG. 1 is a cross sectional view of a knee airbag system (occupant-leg protection system) as an airbag assembly including an airbag according to an embodiment of the present invention. FIG. 2 is an exploded perspective view of the knee airbag. FIG. 3 is a perspective view of a rear panel having a support sheet. FIG. 4 is a cross sectional view taken along line 4—4 in FIG. 3. FIG. 5 is a cross sectional view taken along line 5—5 in FIG. 4. FIG. 6 is a plan view of a vicinity of a gas-generator insertion hole of the rear panel with a support sheet. FIG. 7 is an enlarged perspective view of the gas-generator insertion hole.

A knee airbag system 10 is mounted to an interior panel 2 provided in front of a car seat 1. Referring to FIG. 1, the knee airbag system 10 includes a container-like retainer 12, a knee airbag 14 joined with an interior of the retainer 12, and a gas generator 16 for inflating the knee airbag 14. The retainer 12 is disposed at an opening 4 of the interior panel 2. The knee airbag 14 is normally accommodated in the retainer 12 in a folded state. A lid 18 is mounted to a front of the retainer 12 so as to cover the knee airbag 14. The lid 18 is normally arranged approximately flash with the interior panel 2. When the knee airbag 14 is inflated, the lid 18 deploys to a front side of the interior panel 2 around a lower end thereof.

In the embodiment, the opening 4 is arranged at a height equal to or lower than that of a seat surface of the seat 1. The knee airbag 14 expands through the opening 4 from below upwardly along a front face (face adjacent to the occupant) of the interior panel 2.

An outer shell (airbag body) of the knee airbag 14 is formed of a front panel 20 adjacent to an occupant and a rear panel 22 adjacent to the interior panel 2. Referring to FIG. 2, in the embodiment, the front panel 20 and the rear panel 22 have an approximately rectangular shape and an equal size. The front panel 20 and the rear panel 22 are joined all around the peripheries thereof by connecting means such as sewing to form a bag. Reference numeral 24 denotes a seam made of a thread or the like for joining the peripheries together.

Referring to FIG. 1, the knee airbag 14 includes tie panels 26 for joining the front panel 20 with the rear panel 22 to restrain the expansion of the front panel 20 toward the occupant during the inflation of the knee airbag 14. Numerals 28 and 30 indicate seams for joining opposite ends of the tie panels 26 with the front panel 20 and the rear panel 22, respectively.

A support sheet 32 is attached to a lower part of an inner surface of the rear panel 22. Referring to FIG. 2, the support sheet 32 of the embodiment is an approximately rectangular sheet and has a vertical size smaller than that of the rear panel 22 and an almost equal lateral size. The support sheet 32 is disposed along the inner surface of the rear panel 22 such that a lower side thereof coincides with a lower side of the rear panel 22 and left and right sides thereof coincide with left and right sides of the rear panel 22, respectively. The support sheet 32 is joined to the rear panel 22 at all around the periphery thereof by sewing or the like. As shown in FIG. 3, a seam 34 joins the periphery of the support sheet 32 with the rear panel 22. The lower side and the left and right sides of the support sheet 32 are joined to the rear panel 22 together with the lower side and the left and right sides of the front panel 20 with the seam 24, respectively.

The rear panel 22 and the support sheet 32 have insertion holes 36 and 38 through which the gas generator 16 passes, respectively. Referring to FIG. 6, the insertion holes 36 and 38 are disposed separately with a lateral space therebetween. Accordingly, the support sheet 32 faces (overlaps) the insertion hole 36 of the rear panel 22, and the rear panel 22 faces the insertion hole 38 of the support sheet 32. In the embodiment, the insertion holes 36 and 38 are formed in a slit (cut) shape extending vertically. The space between the insertion hole 36 of the rear panel 22 and the insertion hole 38 of the support sheet 32 serves as a gas-generator insertion space S.

Referring to FIG. 6, the rear panel 22 and the support sheet 32 are connected by sewing or the like at upper and lower sides of the gas-generator insertion space S. Reference numerals 40 and 42 indicate connecting portions (seams). The connecting portion 40 at the upper vicinity of the gas-generator insertion space S extends linearly to connect upper rims of the insertion holes 36 and 38. The connecting portion 42 at the lower vicinity of the gas-generator insertion space S extends linearly to connect lower rims of the insertion holes 36 and 38. As shown in FIG. 7, the gas-generator insertion space S is surrounded by the rear panel 22 and the support sheet 32, and is formed in a tunnel shape with opposite ends communicating with the insertion holes 36 and 38, respectively.

Referring to FIGS. 5 and 7, the linear connecting portion 40 of the embodiment is made of a pair of seams 40a and 40b extending in parallel with each other. The linear connecting portion 42 is also made of a pair of seams 42a and 42b extending in parallel with each other. The linear connecting portions 40 and 42 have circular connecting portions 44, 46, 48, and 50 on opposite sides thereof, each connecting the rear panel 22 and the support sheet 32 by sewing or the like. Opposite ends of the seams 40a and 40b are connected to the circular connecting portions 44 and 46, respectively. Opposite ends of the seams 42a and 42b are connected to the circular connecting portions 48 and 50, respectively.

The gas generator 16 is formed in a rod (column) shape and has a gas port in a side circumference thereof at one end (distal end). The gas generator 16 is a cylindrical pressure-tight casing filled with a gas-generating agent, and has an ignition squib (not shown) at the other end (rear end).

The gas generator 16 is provided with a fixing member 52. Referring to FIG. 2, the fixing member 52 includes a body 52a arranged along a side circumference of the gas generator 16 at the rear end thereof (side facing the support sheet 32), an arch section 52b placed over the body 52a, and a stud bolt 52c projecting from a backside of the body 52a. The gas generator 16 is mounted to the fixing member 52 such that the distal end thereof is inserted into the arch section 52b. The rear end of the gas generator 16 projects from the fixing member 52.

Most of the distal end of the gas generator 16 is disposed in the knee airbag 14. The rear end projecting from the fixing member 52 is inserted into the gas-generator insertion space S at an outside of the knee airbag 14. A band (not shown) is mounted to the rear end of the gas generator 16, so that the periphery of the gas-generator insertion space S is hermetically fixed to the side circumference of the gas generator 16. A connector 54 is connected to the rear end of the gas generator 16 arranged outside the knee airbag 14 for supplying a current from a gas-generator control unit (not shown) to the squib.

The support sheet 32 and the rear panel 22 located on the backside of the gas generator 16 have bolt-insertion holes 56 and 58, respectively, so that the stud bolts 52c projecting from the fixing member 52 pass through. In the embodiment, as shown in FIG. 2, two stud bolts 52c project from the fixing member 52. Accordingly, the support sheet 32 has two bolt-insertion holes 56, and the rear panel 22 has two bolt-insertion holes 58. The stud bolts 52c are inserted into the bolt-insertion holes 56 and 58 and project outward from the knee airbag 14. The retainer 12 has bolt-insertion holes for the stud bolts 52c to pass through at positions corresponding to the bolt-insertion holes 56 and 58. Referring to FIG. 1, each of the stud bolts 52c passes through the bolt-insertion holes and projects to the backside of the retainer 12. A nut 60 is tightened to each of the stud bolts 52c, so that the fixing member 52 is fixed to the retainer 12 and the rear panel 22 and the support sheet 32 of the knee airbag 14 are clamped between the fixing member 52 and the retainer 12.

In the knee airbag system 10 with such a structure, when a car crash is detected, the squib of the gas generator 16 is energized to activate the gas generator 16, thereby feeding gas into the knee airbag 14. The knee airbag 14 starts to inflate with the gas, and pushes the lid 18 to deploy so as to cover the front face of the interior panel 2, as shown in FIG. 1. The inflated knee airbag 14 prevents legs of an occupant in the seat 1 from colliding with the interior panel 2.

In the knee airbag system 10, the rear panel 22 of the knee airbag 14 and the support sheet 32 attached to the rear panel 22 have the gas-generator insertion holes 36 and 38 with a lateral distance therebetween, respectively. Since the rear end of the gas generator 16 passes through both of the insertion holes 36 and 38, gas does not leak from the knee airbag 14 through the insertion holes 36 and 38, as compared with a conventional airbag in which the gas generator passes though only one insertion hole.

In the embodiment, the gas-generator insertion space S with a tunnel shape is formed between the insertion holes 36 and 38, so that resistance of gas flow between the inner circumference of the gas-generator insertion space S and the outer circumference of the gas generator 16 is high. Accordingly, an amount of the gas flowing from the knee airbag 14 through the insertion holes 36 and 38 is extremely small. As a result, the knee airbag 14 can be inflated sufficiently early even with a low-output gas generator 16.

The embodiment is only an example of the invention, and the invention is not limited to the embodiment. For example, the support sheet 32 in the embodiment has the size to cover the entire inner surface of the lower part of the rear panel 22. Alternatively, the support sheet 32 may have a size to form the tunnel-shaped gas-generator insertion space S.

The embodiment is an example of the present invention applied to the knee airbag system, and the invention can be applied to other airbag systems (airbag assemblies).

While the invention has been explained with reference to the specific embodiments of the invention, the explanation is illustrative and the invention is limited only by the appended claims.

What is claimed is:

1. An airbag comprising:
   an airbag body having a first insertion hole for a gas generator, and
   a support sheet attached to the airbag body and having a second insertion hole for the gas generator, said support sheet facing the first insertion hole and the second insertion hole facing the airbag body so that a space is formed between the first insertion hole and the second insertion hole for accommodating a gas-generator, wherein the first insertion hole and the second insertion hole are configured in a manner wherein the gas generator, which is disposed in the space, is supported to be sealed in the space so that a trailing end of the gas generator projects out of the air bag body and is configured to be connected to a connector at a location outside the airbag body.

2. An airbag according to claim 1, further comprising a connecting portion for connecting the airbag body and the support sheet, said connecting portion surrounding the space and extending between the first and second insertion holes so that the gas generator is sealingly retained by the connecting portion.

3. An airbag according to claim 2, wherein said connecting portion includes parallel seams to form said space therebetween.

4. An airbag assembly comprising the airbag according to claim 1, and a rod-shaped gas generator passing through the first and second insertion holes and having a distal end arranged inside the airbag and a rear end arranged outside the airbag.

5. An airbag assembly according to claim 4, wherein said airbag is a knee airbag.

6. An airbag device comprising the airbag according to claim 1, a gas generator attached to the airbag for providing gas to the airbag, and a retainer for holding the airbag and gas generator.

7. An airbag according to claim 1, wherein said first and second insertion holes are located at a portion away from a center area of the airbag so that the gas generator is located at the center area.

8. An airbag according to claim 7, wherein the portions of the airbag body and the support sheet which form the space between the first insertion hole and the second insertion hole, are configured to be hermetically fixed to a side peripheral portion of the gas generator.

9. An airbag assembly according to claim 4, wherein the first and second insertion holes are located at a portion away from a center area of the airbag so that the gas generator is located at the center area, and portions of the airbag body and the support sheet which form the space between the first insertion hole and the second insertion hole, are configured to be hermetically fixed to a side peripheral portion of the gas generator.

10. An airbag assembly according to claim 9, wherein the gas generator is disposed in a fixing member having stud bolts which each pass through sets of overlapping holes formed in the air bag body and the support sheet, for connection to a retainer configure to hold the airbag in a predetermined operative position.

11. An airbag assembly according to claim 10, wherein the fixing member is fully enclosed in the airbag body.

* * * * *